United States Patent
De Vaan et al.

(10) Patent No.: US 6,873,469 B2
(45) Date of Patent: Mar. 29, 2005

(54) PROJECTION DEVICE WITH WIRE GRID POLARIZERS

(75) Inventors: Adrianus Johannes Stephanes Maria De Vaan, Eindhoven (NL); Stephen Charles McClain, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 4 days.

(21) Appl. No.: 10/264,898

(22) Filed: Oct. 4, 2002

(65) Prior Publication Data

US 2003/0081322 A1 May 1, 2003

(30) Foreign Application Priority Data

Oct. 9, 2001 (EP) ............................................. 01203815

(51) Int. Cl.⁷ ........................... G02B 27/14; G02B 5/30; G02B 27/28
(52) U.S. Cl. ........................ 359/629; 359/638; 359/495
(58) Field of Search .............................. 359/494–497, 359/629, 636, 638, 639, 640, 831, 833; 353/31–34, 81

(56) References Cited

U.S. PATENT DOCUMENTS

| | | | | | |
|---|---|---|---|---|---|
| 5,465,177 | A | * | 11/1995 | Barbier et al. | 359/636 |
| 5,490,013 | A | * | 2/1996 | Shimizu et al. | 359/637 |
| 5,724,184 | A | * | 3/1998 | Hesline | 359/494 |
| 5,900,976 | A | * | 5/1999 | Handschy et al. | 359/495 |
| 6,208,463 | B1 | | 3/2001 | Hansen et al. | 359/486 |
| 6,480,330 | B1 | * | 11/2002 | McClay et al. | 359/495 |
| 6,585,378 | B2 | * | 7/2003 | Kurtz et al. | 353/31 |
| 2002/0001135 | A1 | * | 1/2002 | Berman et al. | 359/640 |
| 2002/0154420 | A1 | * | 10/2002 | Magarill et al. | 359/831 |
| 2003/0048421 | A1 | * | 3/2003 | Du | 353/31 |
| 2004/0047045 | A1 | * | 3/2004 | Cobb | 359/634 |

* cited by examiner

*Primary Examiner*—Georgia Epps
*Assistant Examiner*—Alicia M. Harrington

(57) ABSTRACT

An optical device for processing radiation that includes a beam splitter and a plurality of radiation processing parts arranged to process the characteristics of different radiation components separately, The polarizing beam splitter includes a wire grid polarizer, a first transparent plate arranged adjacent one side of the polarizer and a second transparent plate arranged adjacent the other side. Each of the first and second plates have substantially equal optical thickness profile.

17 Claims, 1 Drawing Sheet

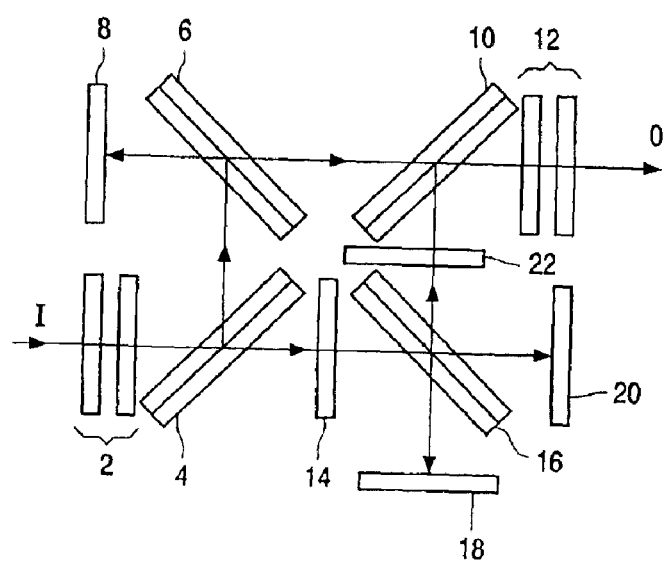

PROJECTION DEVICE WITH WIRE GRID POLARIZERS

FIELD OF THE INVENTION

This invention relates to optical devices for processing radiation, in particular but not exclusively colour projection devices, and to polarising beam splitters.

BACKGROUND

Colour projection systems are known in the prior art. Consumer products, such as rear projection televisions, rear projection monitors and front projection systems are proposed in which liquid crystal on silicon (LCOS) micro displays are used. Several optical architectures exist for use with three LCOS panels, one each for red, green and blue. Achieving high contrast in a compact and cost-effective system remains problematic.

One existing architecture, referred to as the Color Quad™ architecture, proposed by Color Link uses four polarising beam splitter cubes in a square arrangement together with selectively polarising retardance plates such as the Color Select™ plates produced by the same company, to perform the colour splitting and polarisation functions necessary in an LCOS projection system. The system performs with high contrast, but the polarising beam splitter cubes are relatively expensive and require skew angle compensating retarders next to each LCOS panel in order to achieve high contrast. Also, the polarising beam splitter cubes are subject to strain birefringence, due to mounting or temperature induced stresses, further decreasing the contrast and the contrast uniformity, A broadband wire grid polariser for the visible spectrum is described in U.S. Pat. No. 6,208,463, assigned to Moxtek, and incorporated by reference herein. The company Moxtek produces wire grid polarisers which may be used as beam splitters. A paper, "An Improved Polarising Beam Splitter LCOS Projection Display Based on Wire-Grid Polarisers", Arnold and Gardner, SIDOI Digest, 2001, describes the use of wire grid polarisers for a projection lens design architecture. In the paper, it is proposed to use a wire grid polariser and describes astigmatism produced by a tilted plate in a non-collimated beam as a problem in such as system.

It is an object of the invention to provide improvements in relation to these known devices.

SUMMARY OF THE INVENTION

In accordance with a first aspect of the invention, there is provided an optical device for processing radiation, said device comprising a polarising beam splitter and a plurality of radiation processing parts arranged to process the characteristics of different radiation components separately, wherein the polarising beam splitter comprises a selectively reflective polariser having first and second sides, a first transparent plate arranged adjacent one side of the polariser and a second transparent plate arranged adjacent the other side, wherein substantially all of the polarising effect of the beam splitter is provided by the selectively reflective polariser.

This aspect of the invention provides an arrangement wherein the functionality of a plate polariser, such as a wire grid polariser, can be used whilst the optical path lengths and astigmatism, if any, produced in the device may be made substantially equal for each different optical path traversing the beam splitter. Preferably, the optical thickness profiles, i.e. the cross sections adjusted in accordance with any difference in refractive index between the two elements, are substantially the same. The components may then be combined, or otherwise processed in a similar manner without the components carrying substantially different systematic errors, which can prove to be extremely difficult subsequently to correct.

Furthermore, by placing transparent elements on each side of the selectively reflective polariser, and having the plates substantially planar, preferably of equal thickness, stress birefringence effects due to mechanical and thermally induced stress can be reduced significantly.

In accordance with a further aspect of the invention, there is provided a polarising beam splitter comprising a planar reflective polariser having first and second substantially planar sides, a first transparent plate arranged adjacent one side of the polariser and a second transparent plate arranged adjacent the other side, wherein substantially all of the polarising effect of the beam splitter is provided by the planar reflective polariser. Preferably, each of said first and second plates are of substantially equal thickness.

This aspect provides a beam splitter for use in the arrangement of the first aspect of the invention.

In accordance with a further aspect of the invention there is provided an optical device for processing radiation, said device comprising a polarising beam splitter and a plurality of radiation processing parts arranged to process the characteristics of different radiation components separately, wherein the polarising beam splitter comprises a wire grid polariser having first and second sides, a first transparent element arranged adjacent said first side and in contact with the wire grid polariser over substantially all said first side, and a second transparent element adjacent said second side and in contact with the wire grid polariser over substantially all said second side.

This aspect of the invention provides a device using a wire grid polariser as a polarising beam splitter, wherein the flatness of the wire grid polariser surfaces may be consistently obtained, even during mechanically and thermally induced stressing of one or more of the two elements and the wire grid polariser itself.

Further features and advantages of the different aspects of the invention will be apparent from the following detailed description of preferred embodiments of the invention, made with reference to the accompanying drawings.

BRIEF DESCRIPTION OF THE DRAWINGS

The FIGURE is a schematic plan diagram of a colour video projection apparatus in accordance with an embodiment of the invention.

DETAILED DESCRIPTION

The FIGURE shows a colour video projector modulation device in accordance with an embodiment of the invention. A colour video projector in accordance with this embodiment of the invention includes the modulation device along with a radiation emitter, not shown, emitting substantially white light in the form of an input beam (I) and further optical components, not shown, typically including an output lens for projecting the output beam towards a projector screen.

The modulation device includes a green/magenta retardation plate 2, including birefringent layers for selectively polarising the input beam, which is typically plain polarised, to produce a first component, which consists substantially exclusively of wavelength in the green part of the spectrum and has a first polarisation, and a second component, which consists substantially fully of radiation in the magenta part of the spectrum, which is orthogonally polarised. A first polarising beam splitter 4 splits the different components by reflecting the green component towards a second polarising beam splitter 6, and to transmit the second component. The second polarising beam splitter 6 reflects substantially all of the incident radiation towards a liquid crystal on silicon (LCOS) radiation modulating panel 8, which modulates the incident radiation beam in accordance with a green video signal applied to the liquid crystal matrix. Accompanying the modulation, the polarisation of the beam is rotated through 90° and the reflected beam is transmitted through the polarising beam splitter 6 towards a third polarising beam splitter 10, which transmits the green component towards a green/magenta retardation plate 12, similar to green/magenta retardation plate 2, to produce part of the output beam (O). The magenta component transmitted by the first beam splitter 4 is transmitted towards a red/blue retardation plate 14 which selectively polarises the green and blue parts of the incident light such that red and blue components are produced with orthogonal polarisations. A fourth polarising beam splitter 16 then selectively reflects the different components, reflecting the red component towards a second modulating LCOS panel 18, which modulates the incident beam in accordance with a red video signal applied to the liquid crystal matrix, reflects the incident beam and rotates its polarisation. The reflected beam is then transmitted through the fourth polarising beam splitter 16 towards a second red/blue retardation plate 22, similar to red/blue retardation plate 14, and onto third polarising beam splitter 10, where the red component of the beam is reflected towards the retardation plate 12 to form part of the output beam (O).

The blue component of the beam is transmitted through polarising beam splitter 16 towards a third LCOS light modulating panel, which modulates the light in accordance with a blue video signal applied to liquid crystal matrix thereof, and reflects the light along with a rotation of its polarisation by 90° towards the fourth polarising beam splitter 16, where the blue component is reflected towards red/blue retardation plate 22, which transmits the blue component towards the third polarising beam splitter 10, which reflects the blue components towards the green/magenta retardation plate 12, forming the remainder of the output beam (O).

Each of the polarising beam splitters 4, 10, 16 are constructed in accordance with an embodiment of the present invention. In this embodiment, a polarising beam splitter is formed of a plate polariser, in the form of a wire grid polariser, sandwiched between two substantially identical transparent plates mounted parallel to one another. Each transparent plate may be formed of a substance such as glass. The wire grid polariser may for example be formed on one of the glass plates, which forms a substrate thereof, and the second glass plate may then be adhered, over its whole surface or around its edges, to the first glass plate carrying the wire grid polariser. Where the adhesive is used over the whole surface between the two plates, no air interfaces are included between the two plates. Otherwise, if the two plates are adhered round the surfaces, the central area, which includes the wire grid polariser may include an air interface. In any case, each plate is in contact with the wire grid polariser over substantially all of its respective two sides. The two plates preferably carry anti-reflection coatings on one or both of their main surfaces in order to minimise transmission loss on entry into, exit from, and within, the polarising beam splitter.

The transparent plates are selected to be relatively thin, preferably less than 5 mm. The plates are preferably chosen to be a thickness of between 0.5 and 2.5 mm, typically 1 mm or 2 mm. By the use of polarising beam splitters in accordance with the present invention is that, by selecting such thin plates the optical path length inside the transparent material of the polarising beam splitter can be reduced significantly, so that astigmatism and stress birefringence effects become smaller, resulting in a system of improved performance, in particular providing higher contrast, especially in high lumen systems.

The modulation device also preferably includes an optical component configuration (not shown) for compensating the astigmatism in the output beam (O) created by the transparent plates. The configuration may include an axially offset spherical lens element in the output lens, and/or a plate, of an optical thickness equal to that of the combined optical path length in the transparent plates, arranged in the optical path at an oblique angle, to provide the opposite amount of astigmatism as that introduced by the transparent plates.

It should be noted that the use of wire grid polarisers provides the advantage that skew angle compensating retarders are not required at any of the LCOS panels.

Whilst in the embodiment shown in the Figure, each of the four polarising beam splitters are arranged in accordance with an embodiment of the invention, the modulating device may include one or more other known types of polarising beam splitters in an alternative arrangement. For example, the first polarising beam splitter 4 and/or the third polarising beam splitter 10 may be replaced by a conventional cube-type polarising beam splitter. The second polarising beam splitter and the fourth polarising beam splitters may each be replaced with a conventional cube-type polarising beam splitter. However, if such a beam splitter is to be used, it may be necessary to use one or more skew angle compensating retarders in front of each LCOS panel receiving radiation having passed through the cube-type beam splitter. Furthermore, the third polarising beam splitter 10 may be replaced by a dichroic beam splitter capable of transmitting green light components and reflecting blue and red light components.

In each of these alternative embodiments, it will be appreciated that the use of the polarising beam splitter in accordance with this embodiment of the invention ensures that the optical path length and astigmatisms produced for the different components handled by each polarising beam splitter are equalised. However, not all four beam splitters need to include plane-symmetrical transparent plates to each side of the polarising plate. For example, if the rear plate of the first beam splitter 4 is arranged to be non-planar, such asymmetry between the front and rear plates may be compensated for by introducing a similar non-planarity in the rear plate of the second beam splitter 6; in this case all optical components in corresponding parts of the respective beams traverse the same optical path lengths and undergo the same degree of astigmatism when combined to form the output beam. This is because all components traverse the plates in question only once, more particularly the same number of times. In the case of the fourth beam splitter, such asymmetry could not be compensated in a similar manner, since whilst the red beam traverses the rear plate only once, the blue beam traverses it twice, and the beams are combined inside the beam splitter. However, a small degree of asymmetry may be accepted, depending on the quality of image desired. Indeed, a small degree of asymmetry may be beneficial. In an alternative arrangement, the two plates may be mounted in a non-parallel arrangement, with one plate, acting as a substrate for the wire grid polariser, arranged at an orientation of 45° to the optical axis, and the other, separate, plate arranged such that its outer surface is arranged at a small angle, say less than 10° and more preferably less than 5°, thereto. With this arrangement it is possible to increase contrast in the output beam by deflecting the first surface reflection out of the main optical beam path. A similar effect could be achieved by introducing a small degree of tapering in the cross section of at least one of the plates, such that its outer surface is angularly offset by a similar small angle from 45° to the optical axis, whilst the wire grid polariser remains arranged at the 45° orientation.

In the arrangement described, a first plate is arranged adjacent and in contact with the wire grid polariser over substantially all one side, and a second transparent plate is arranged adjacent and in contact with the wire grid polariser over substantially all its other side. The effect is to provide a consistent and lasting flatness to the polariser surfaces. This effect is particularly beneficial in relation to third beam splitter 10 and the fourth beam splitter 16; these both reflect radiation after it has been imaged at an LCOS panel, and therefore flatness of these reflective surfaces is of particular importance.

Whilst it is preferred that each of the two transparent plates is planar, a degree of non-planarity may be provided in one or each of the plates. In particular, the outer surface(s) of the plate(s) may not be precisely parallel to a central plane of the plate. The non-planarity may take the form of an angular orientation, as described above, and/or a lens-shaping of the surface(s). The plates preferably still remain substantially planar, with a thickness variation across the plate being limited to less than a tenth of the width of the plate, in order to achieve the effect of increasing contrast in the output beam.

Whilst it is preferred that the two transparent plates are substantially equal in thickness, or average thickness in the case of non-planarity, a substantial different in thickness, say 100%, can be employed if for example different further, compensating, optical elements are placed in the individual component parts of the radiation beam. However, with similar optical components in each of the optical paths of the radiation beam, it is preferred that each of the plates is substantially equal in thickness, that is to say less than 10% difference, more preferably less than 5%, being present between the thicknesses of the plates.

In the above embodiments, the polarising effect of the polarising beam splitter is provided solely by the wire grid polariser itself. That is to say, the plates to each side of the polariser have no polarising effect themselves. The plates may however have some polarising effect, if desired. However, preferably substantially all of the polarising effect of the beam splitter, that is to say at least 90% of the polarising effect, is provided by the polariser, in order to define an effective plane in which the large majority of the reflections provided by the beam splitter occur, thereby attaining improved contrast in the system.

The above embodiments are to be understood as illustrative examples of the invention. Further embodiments of the invention are envisaged. For example, an arrangement similar to that shown may be used in a radiation processing device for a colour video camera, wherein the radiation modulators are replaced by radiation detectors such as charge coupled devices (CCDs). It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. An optical device for processing radiation, comprising:
    a planar polarising beam splitter that provides a polarising effect and
    a plurality of radiation processing parts arranged to process, different radiation components separately,
    wherein
    the polarising beam splitter comprises a selectively reflective polariser having first and second sides,
        a first transparent plate arranged adjacent the first side of the polariser and
        a second transparent plate arranged adjacent the second side,
    the first and second plates have an optical thickness profile which is substantially uniform and equal relative to the polarizing beam splitter,
    the beam splitter is arranged to receive an incident beam at an angle of incidence substantially equal to 45°, and
    substantially all of the polarising effect or the beam splitter is provided by the selectively reflective polariser.

2. An optical device according to claim 1, wherein each of the first and second plates are substantially planar.

3. An optical device according to claim 1, wherein each of the plates Is manufactured of substantially the same material.

4. An optical device according to claim 1, wherein the selectively reflective polariser comprises a wire grid polariser.

5. An optical device according to claim 1, wherein the polarising beam splitter is arranged
    to receive a first component beam,
    to reflect at least a portion of the first component beam towards a first processing part and
    to transmit a majority of the reflected beam when reflected from the first processing part.

6. An optical device according to claim 1, wherein the polarising beam splitter is arranged to receive an input beam and to split the input beam into different components beams.

7. An optical device according to claim 1, wherein the polarising beam splitter is arranged to receive different component beams and to combine the component beams to form an output beam.

8. An optical device according to claim 1, wherein the first and second plates exhibit an angle of difference in the arrangement of their outer surfaces.

9. An optical device according to claim 1, wherein the radiation processing parts comprise liquid crystal on silicon (LCOS) radiation modulating panels.

10. An optical device according to claim 1, further comprising
    an optical component configuration for compensating aberrations caused by the transparent plates.

11. An optical device for processing radiation, comprising:
    a plurality of radiation processing parts arranged to process different radiation components separately,
    a first planar polarising beam splitter that provides a polarising effect comprising a first selectively reflective polariser having first and second sides, a first transparent plate arranged adjacent the first side of the polariser and a second transparent plate arranged adjacent the second side, a second polarising beam splitter that provides a polarizing effect comprising a second selectively reflective polariser having first and second sides, a third transparent plate arranged adjacent one side of the second polariser and a fourth transparent plate arranged adjacent the other side, wherein the first and second plates have an optical thickness profile which is substantially equal relative to the polarizing beam splitter, substantially all of the polarising effect of the first beam splitter is provided by the first selectively reflective polariser and substantially all of the polarising effect of the second beam splitter is provided by the second selectively reflective polariser.

12. An optical device according to claim 11, wherein each of the first, second, third and fourth plates have an optical thickness profile which is substantially equal.

13. An optical device according to claim 12, wherein the second polarising beam splitter is arranged to receive different component beams and to combine the component beams to form an output beam.

14. An optical device according to claim 11, wherein the second polarising beam splitter is arranged to receive a second component beam, to reflect at least a portion of the second component beam towards a second processing part and to transmit a majority of the reflected beam when received in reflection from the second processing part.

15. An optical device according to claim 11, further comprising third and fourth beam splitters, each the first, second, third and fourth beam splitters being arranged at substantially 45° to the optical path of the beams being processed by the device, and at substantially 90° intervals with respect to each adjacent beam splitter.

16. A polarising beam splitter comprising a planar reflective polariser having first and second substantially planar sides, a first transparent plate arranged adjacent the first side of the polariser and a second transparent plate arranged adjacent the second side, wherein each of said first and second plates are substantially planar and of substantially uniform and equal thickness, and substantially all of the polarising effect of the beam splitter is provided by the planar reflective polariser.

17. A polarising beam splitter according to claim 16, wherein the polariser is a wire grid polariser.

* * * * *